United States Patent
Grosch et al.

[11] 3,813,938
[45] June 4, 1974

[54] ELECTRODE HOLDER FOR ELECTROMAGNETIC FLOWMETERS

[75] Inventors: Hermann Grosch; Hans-Werner Oelbe, both of Gottingen, Germany

[73] Assignee: Fisher & Porter Company, Warminster, Pa.

[22] Filed: Dec. 4, 1972

[21] Appl. No.: 311,808

[30] Foreign Application Priority Data
Dec. 23, 1971 Germany.......................... 2164111

[52] U.S. Cl. .......................................... 73/194 EM
[51] Int. Cl. .............................................. G01f 1/00
[58] Field of Search ....... 73/194 EM, 304 R, 304 C; 324/29, 30 B; 174/18, 31, 152 R; 204/297 R

[56] References Cited
UNITED STATES PATENTS

| | | |
|---|---|---|
| 2,766,621 | 10/1956 | Raynsford et al. .............. 73/194 EM |
| 2,780,773 | 2/1957 | Channon, Jr. et al. ............ 324/30 B |
| 2,810,879 | 10/1957 | Cade et al. ....................... 324/30 B |
| 2,985,821 | 5/1961 | Del Chiocca .................... 324/30 B |

FOREIGN PATENTS OR APPLICATIONS

| | | | |
|---|---|---|---|
| 1,200,558 | 9/1965 | Germany .................... | 73/194 EM |
| 1,124,154 | 8/1968 | Great Britain ............... | 73/194 EM |

*Primary Examiner*—Charles A. Ruehl
*Attorney, Agent, or Firm*—Michael Ebert

[57] ABSTRACT

An electrode holder for an electromagnetic flowmeter whose flow tube is provided with a lateral extension having a passage therein into which a metering electrode is insertable, the tip of the inserted electrode being in contact with the fluid conducted through the tube. The holder includes a case which is attachable to the flow tube extension. A sealing support is housed within the case, the support having an electrode passage therein which registers with the passage in the flow tube extension. Disposed at the mouth of the electrode passage is a shut-off device which, when the electrode is inserted, is displaced to permit the electrode to enter the passage, but when the electrode is withdrawn, acts automatically to block the mouth of the passage to prevent leakage of fluid.

7 Claims, 2 Drawing Figures

ELECTRODE HOLDER FOR ELECTROMAGNETIC FLOWMETERS

BACKGROUND OF THE INVENTION

This invention relates generally to electromagnetic flowmeters having metering electrodes, and more particularly to an electrode holder which is detachably mounted on the flow tube of the flowmeter.

A magnetic flowmeter is volumetric fluid flow rate device utilizing the characteristics of a metered fluid to produce an induced voltage when flowing through a magnetic field. The operation of the meter is based on Faraday's Law of Induction which states that the voltage induced across a conductor as it moves at right angles through a magnetic field is proportional to the velocity thereof.

In a magnetic flowmeter, the fluid to be measured is conducted through a flow tube having a pair of electrodes mounted therein at diametrically-opposed points, a magnetic field being generated by an excitation winding in a plane perpendicular to the longitudinal axis of the flow tube, which plane includes the transverse axis common to the electrodes. If one considers a segment of the metered fluid as a conductor whos length $D$ is equal to the diameter of the tube, then as the fluid conductor moves at a velocity $V$ through a magnetic field $B$, the voltage induced across this conductor in the plane of the meter electrodes will be porportional to the rate of fluid flow.

This may be expressed mathematically by the following equation:

$$E = I/C\ BDV,$$

where $C$ is a dimensionless constant.

There is a practical need in electromagnetic flowmeters for means to remove the electrodes from the flow tube so that they may be cleaned or replaced. Since the electrode is admitted into the flow tube, it is essential to also provide shut-off means to prevent leakage of the fluid thorugh the electrode passage.

One known electrode holder for this purpose is described in German Patent DAS 1,200,558, wherein the holder includes a highly elastic circumferential joint that completely encircles the inserted electrode and functions as a shut-off device. When the electrode is withdrawn, the elastic circumferential joint is decompressed to close the electrode passage. And when an electrode is inserted, the conical areas of the joint are considerably compressed to seal the electrode, thus causing wear and tear of the joint. Consequently due to elongation, hardening or tear, the sealing effect is jeopardized for the inserted as well as the withdrawn electrode.

In an attempt to overcome these drawbacks, radial cuts were made in the joint, the cuts being covered by sliding thereover an elastic sleeve in conjunction with a slip helical spring. However, attaching a rubber sleeve over the joint presents practical difficulties. Moreover, the problems which arise with an unslit circumferential joint also arise with a rubber sleeve, thereby making it necessary to repeatedly replace the shut-off device and to completely disassemble the electrode holder.

SUMMARY OF INVENTION

In view of the foregoing, it is the main object of this invention to provide an electrode holder which is mountable on the flow tube of an electromagnetic flowmeter, the holder incorporating a shut-off device which automatically seals off the electrode passage in the holder when the electrode is removed.

More specifically, it is an object of this invention to provide an electrode holder of the above type incorporating a shut-off device of simple design, which device is maintenance-free and is readily replaceable.

A significant feature of the present invention as distinguished from shut-off devices of the type heretofore known, is that the device is displaced from the mouth of the electrode passage when the electrode is inserted and automatically reverts to a position blocking the mouth when the electrode is withdrawn.

Briefly stated, these objects are attained in an electrode holder in accordance with the invention wherein the holder includes a case which is attachable to a lateral extension on the flow tube, which extension is provided with a passage into which a metering electrode is insertable.

Housed in the case is a sealing support having an electrode passage which registers with the passage in the tube extension. Disposed at the mouth of the electrode passage is a shut-off device which is adapted, in the absence of an electrode, to block the mouth, the device being displaced by the electrode, when it is inserted, to permit entry of the electrode into the electrode passage, the device reverting automatically to its blocking position when the electrode is withdrawn.

In one embodiment of the invention, the shut-off device is constituted by a flexible tongue of elastomeric material and in another embodiment of the device, it takes the form of a displaceable valve ball maintained under pressure in a guide sleeve transverse to the axis of the electrode passage.

OUTLINE OF DRAWING

For a better understanding of the invention as well as other objects and further features thereof, reference is made to the following detailed description to be read in conjunction with the accompanying drawing, wherein.

DESCRIPTION OF INVENTION

Figure 1:
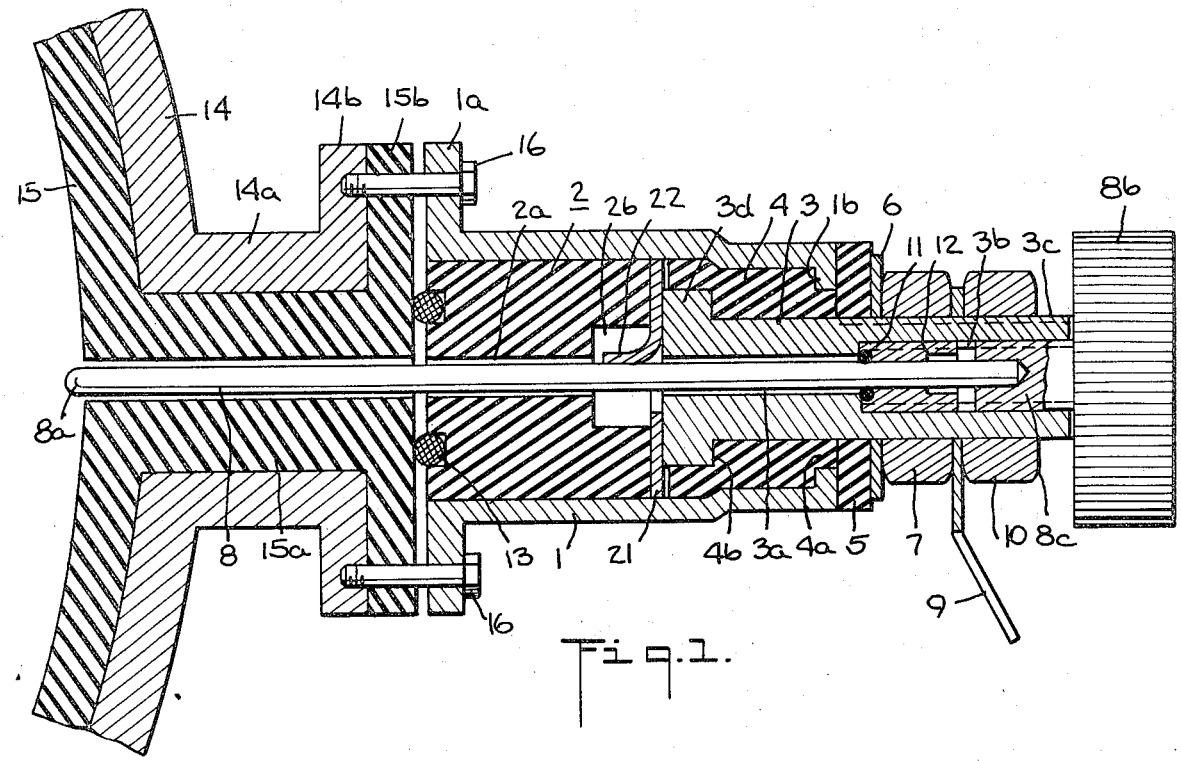
FIG. 1 is a longitudinal section taken through one embodiment of an electrode holder in accordance with the invention, the holder incorporating a shut-off device in the form of a rubber tongue.

Referring now to FIG. 1, there is partly shown the flow tube 14 of an electromagnetic flowmeter that is provided with an electrode holder in accordance with the invention.

In flow tube 14, the fluid to be measured is conducted in the direction of the longitudinal axis which is perpendicular to the transverse axis extending between a pair of diametrically opposed pole-shaped electrodes, only one of which, designated by numeral 8, is shown in the Figure.

The interior surface of flow tube 14 is covered by an insulating liner 15. Extending laterally from the tube is a short pipe 14a, provided with an end flange 14b, the pipe serving as an inlet for pole electrode 8. The insulating liner 15 is extended into pipe 14a and over flange 14b to provide insulation therefor. The insulating sleeve surrounding electrode 8 is designated by numeral 15a and the insulation layer covering flange 14b is designated by numeral 15b.

The tip 8a of electrode 8 protrudes slightly into the interior of flow tube 14 in order to effect an electrical connection with the fluid flowing therethrough, so that a signal may be developed across the electrodes as a function of flow rate.

The electrode holder for electrode 8 includes a tubular case 1 whose front end is provided with a mounting flange 1a and whose rear end is formed into a collar 1b. Case 1 is mounted on pipe 14 by means of screws 16 which pass through flange 1a of the case and insulation layer 15b into threaded holes in flange 14b to effect a hermetic seal.

Seated within the rear section of case 1 is an insulating bushing 4 having an extension 4a which is fitted within collar 1b. The front end of bushing 4 has an annular shoulder 4b formed therein which surrounds the enlarged base 3d of an electrically-conductive tubular lug 3. Lug 3 passes through insulating bushing 4 and protrudes from the rear of case 1. The central bore through lug 3 defines a passage 3a for electrode 8, this passage extending into the protruding rear section of lug 3. This section is provided with an interior female thread 3b and an exterior male thread 3c.

The protruding section of lug 3 is encircled by an insulating washer 5 which abuts collar 1b of the case, and a washer 6 which is pressed against insulating washer 5 by a holding nut 7. The connecting lead 9 for electrode 8 is clamped between holding nut 7 and a second holding nut 10 mounted on the protruding section of lug 3.

Screwed into female thread 3b of the protruding section of lug 3 is a nipple 12 provided at its front end with an O-ring to seal electrode 8. O-ring 11 is received in a groove in the face of lug 3 and is more or less pressed against electrode 8 by adjusting nipple 12. In this way, the sealing effect is accomplished in a simple manner.

The rear end of electrode 8 is anchored in the shank 8c of a knurled nob 8b, the shank being screwed into female thread 3b of the protruding section of lug 3. Thus the electrode is inserted or withdrawn by means of knob 8b.

Seated within the front section of case 1 is a tubular sealing support 2 made of insulating material, the support being readily replaceable when the electrode is withdrawn. The front face of support 2 is provided with a groove to accommodate an O-ring 13 which serves as a gasket and is pressed against the flange insulating layer 15b. Support 2 is provided with a longitudinal electrode passage 2a which extends from the front face to the rear face of the support, the passage at the rear being enlarged to create a circular chamber 2b. Electrode passage 2a registers with the passage in the flow tube extension 14a.

Interposed between the rear face of sealing support 2 and the base 3d of lug 3 is a flat elastomeric gasket 21 having an elastic tongue 22 which is displaceable into chamber 2b of the support. The gasket may be made of rubber or plastic material. The gasket structure may be laminar, and the tongue may be punched out of the gasket.

Upon removal of electrode 3, tongue 22 lies in the plane of gasket 21 and covers the mouth of the electrode passage, thereby sealing off this passage against the flow of fluid. It will be appreciated that sealing support 2 and rubber gasket 21 together with its tongue 22 may be readily replaced after dismounting the electrode holder.

Thus in the absence of electrode 8, the tongue 22 blocks the electrode passage and prevents the leakage of fluid therefrom. In fact, the presence of fluid in the electrode passage 2a exerts a sealing pressure on the tongue. When, however, an electrode is inserted, the tongue is displaced away from the mouth, as shown in FIG. 1, to permit the electrode to enter electrode passage 2a and the aligned passage in flow tube extension 14a. When the electrode is thereafter removed, for cleaning or any other purpose, the tongue reverts automatically to its blocking position.

Figure 2:
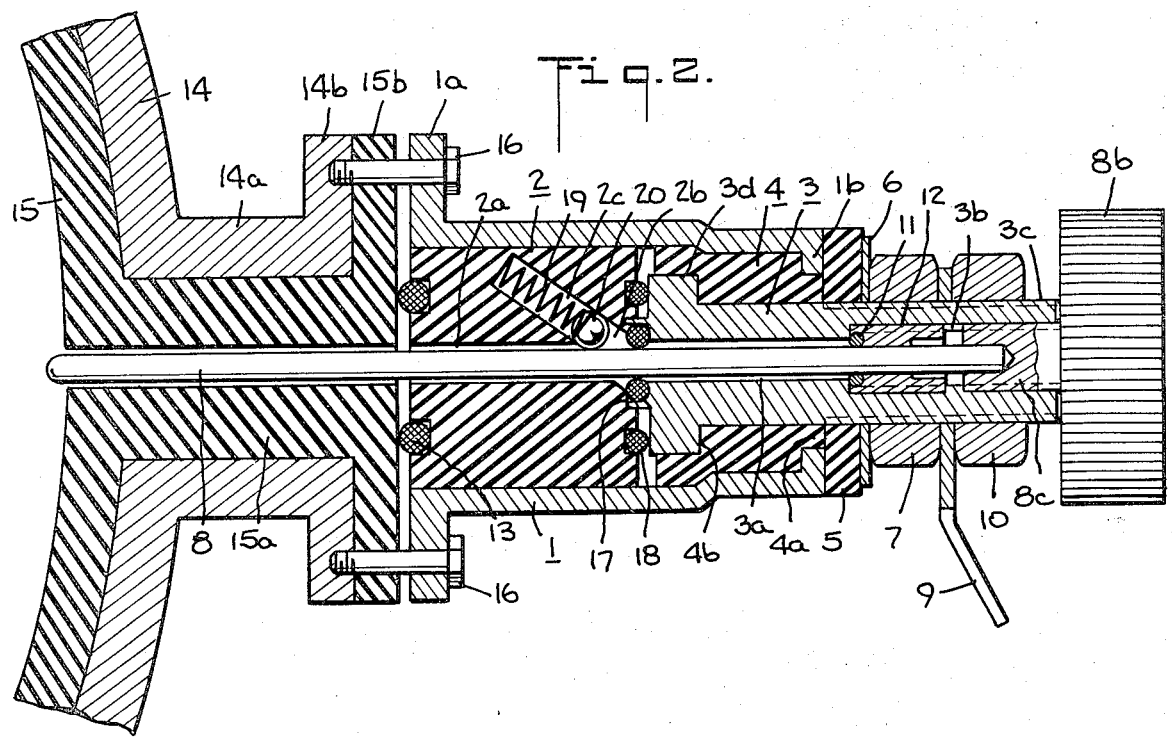
FIG. 2 is a longitudinal section of another embodiment of the holder, the shut-off device being of the ball-valve type.

In the electrode holder embodiment shown in FIG. 2, sealing between the rear face of sealing support 2 and the base 3d of lug 3 is effected by an O-ring 18 fitted into a groove in the sealing support and a concentrically arranged O-ring 17 fitted into an annular projection from base 3d of lug 3, ring 17 being seated in chamber 2b of the electrode passage 2a. Thus O-ring 17 lies within chamber 2a and surrounds the mouth of the electrode passage. Communicating with the chamber 2b is a guide sleeve 2c which is transversely inclined with respect to the electrode passage, preferably at an acute angle of 30°. Contained in sleeve 2c is a compression spring 19 that urges a valve ball 20 toward O-ring 17.

When electrode 8 is removed, valve ball 20 is pressed against O-ring 17 and thereby serves to block the electrode passage and prevent leakage of fluid. When electrode 8 is inserted, ball 20 is displaced and forced into guide sleeve 2c to permit the electrode to enter the electrode passage 2a and the registered passage in tube extension 14a.

When the electrode holder is detached from the flow tube, the sealing support 2 together with the shutoff device (spring 19 and ball 20) may be easily removed and replaced. The other components of the holder are identical to those shown in FIG. 1 and have corresponding reference numerals. The shut-off device shown in FIG. 2 is wear-resistant and free from other detrimental effects, and it assures an excellent sealing action as long as the valve ball is maintained under strong tension.

While there have been shown and described preferred embodiments of an electrode holder for electromagnetic flowmeters in accordance with the invention, it will be appreciated that many changes and modifications may be made therein without, however, departing from the essential spirit thereof.

We claim:

1. An electrode holder for an electro-magnetic flowmeter whose flow tube is provided with a lateral extension having a passage therein into which a metering electrode is insertable to bring the tip thereof in contact with the fluid conducted through the tube, said holder comprising:
   A. a demountable case attachable to said extension, and projecting therefrom,
   B. a sealing support housed in said case and having an electrode passage which registers axially with the extension passage, and
   C. a shut-off device disposed at the mouth of the electrode passage, and accessible for replacement when said case is detached from said extension, said device having means which in the absence of the metering electrode blocks the mouth and which, when the electrode is inserted, is displaced to permit it to enter the electrode passage, said device reverting automatically to its blocking position when the electrode is withdrawn.

2. A holder as set forth in claim 1, wherein said shut-off device is constituted by a flexible tongue of elastomeric material which normally lies over the mouth of the electrode passage.

3. A holder as set forth in claim 1, wherein said shut-off device is constituted by a displaceable valve ball which is spring by a srping disposed in a guide sleeve normally to block said mouth, said sleeve being transversely arranged relative to said electrode passage, said ball being displaced into said sleeve by an inserted electrode.

4. A holder as set forth in claim 1, further including a tubular lug whose front section is disposed within said case and which extends therefrom, the front face of said lug being adjacent the mouth of said electrode passage in said sealing support and having a passage therein in registration with said electrode passage, the rear end of said electrode being secured to a knob whose shank is threadably received in said lug.

5. A holder as set forth in claim 4, wherein said shut-off device is constituted by a rubber gasket interposed between the front face of said lug and said support, said gasket having a tongue punched therein adapted to block said mouth and to be displaced by an inserted electrode.

6. A holder as set forth in claim 4, wherein said shut-off device is constituted by a guide sleeve disposed in said sealing support at an angle to the mouth of said electrode passage, said sleeve having a compression spring therein which normally urges a valve ball against said mouth, said ball being displaced by the inserted electrode.

7. A holder as set forth in claim 4, wherein the front section of said lug in said case is surrounded by an insulating bushing.

* * * * *

UNITED STATES PATENT OFFICE
CERTIFICATE OF CORRECTION

Patent No. 3,813,938     Dated June 4, 1974

Inventor(s) Hermann Grosch and Hans-Werner Oelbe

It is certified that error appears in the above-identified patent and that said Letters Patent are hereby corrected as shown below:

Column 1, line 26 "whos" should have read -- whose --
Column 3, line 48 "port being" should have read --port 2 being --
          line 65 "3" should have read -- 8 --
Column 5, line 12 "spring" first instance should have read --urged--
          line 12 "srping" should have read -- spring --

Signed and sealed this 17th day of September 1974.

(SEAL)
Attest:

McCOY M. GIBSON JR.
Attesting Officer

C. MRSHALL DANN
Commissioner of Patents